United States Patent [19]
Matsen et al.

[11] Patent Number: 5,645,747
[45] Date of Patent: Jul. 8, 1997

[54] COMPOSITE CONSOLIDATION USING INDUCTION HEATING

[75] Inventors: Marc R. Matsen, Seattle; Donald M. Montgomery, Rochester; Susan V. Laurenti, Bothell, all of Wash.

[73] Assignee: The Boeing Company, Seattle, Wash.

[21] Appl. No.: 404,014

[22] Filed: Mar. 13, 1995

Related U.S. Application Data

[62] Division of Ser. No. 92,050, Jul. 15, 1993, Pat. No. 5,410,133, which is a division of Ser. No. 681,004, Apr. 5, 1991, Pat. No. 5,229,562.

[51] Int. Cl.$^6$ ................................................. H05B 6/10
[52] U.S. Cl. ........................... 219/645; 219/659; 264/332
[58] Field of Search .............................. 219/615, 645, 219/659; 428/301; 29/125, 130–132; 264/332, 338

[56] References Cited

U.S. PATENT DOCUMENTS

| | | | |
|---|---|---|---|
| 3,395,993 | 8/1968 | Bristow | 428/633 |
| 3,615,277 | 10/1971 | Kreilder | 428/608 |
| 3,639,974 | 2/1972 | Finnegan | 228/190 |
| 3,892,835 | 7/1975 | Holdsworth | 264/332 |
| 3,900,150 | 8/1975 | Delgrosso et al. | 428/608 |
| 3,919,764 | 11/1975 | Berghezan | 228/185 |
| 3,981,427 | 9/1976 | Brookes | 228/122.1 |
| 4,029,838 | 6/1977 | Chamis et al. | 428/301 |
| 4,307,276 | 12/1981 | Kurata et al. | 219/650 |
| 4,340,650 | 7/1982 | Pattanaik et al. | 428/675 |
| 4,352,230 | 10/1982 | Sukenik | 29/125 |
| 4,398,659 | 8/1983 | Richter | 228/124.1 |
| 4,426,033 | 1/1984 | Mizuhara | 228/56.3 |
| 4,499,156 | 2/1985 | Smith et al. | 428/614 |
| 4,602,731 | 7/1986 | Dockus | 228/121 |
| 4,610,934 | 9/1986 | Boecker et al. | 428/627 |
| 4,621,761 | 11/1986 | Hammond et al. | 228/124.1 |
| 4,622,445 | 11/1986 | Matsen | 219/615 |
| 4,630,767 | 12/1986 | Mizuhara | 228/122.1 |
| 4,698,271 | 10/1987 | Moorhead | 428/621 |
| 4,699,849 | 10/1987 | Das | 428/698 |
| 4,754,114 | 6/1988 | Sommer et al. | 219/676 |
| 4,797,155 | 1/1989 | Das | 75/229 |
| 4,913,910 | 4/1990 | McCarville et al. | 425/336 |
| 4,934,581 | 6/1990 | Ibe et al. | 228/190 |
| 4,955,803 | 9/1990 | Miller et al. | 425/145 |

OTHER PUBLICATIONS

*Developments in Titanium Metal Matrix Composites*, Mar. 1984 Smith, Froes (p. 8).

Primary Examiner—Tu Hoang
Attorney, Agent, or Firm—John C. Hammar

[57] ABSTRACT

A process for consolidating a composite material comprises the steps of forming a workpiece including a matrix interspersed with fibers, supporting the workpiece by an electrically conductive support, inductively heating the support and thereby conductively heating the workpiece, and applying pressure to the heated workpiece. We apply the pressure by passing the support and workpiece through spaced rolls. To keep the workpiece from sticking to the support (i.e., the mandrel), we use boron nitride as a release agent.

6 Claims, 8 Drawing Sheets

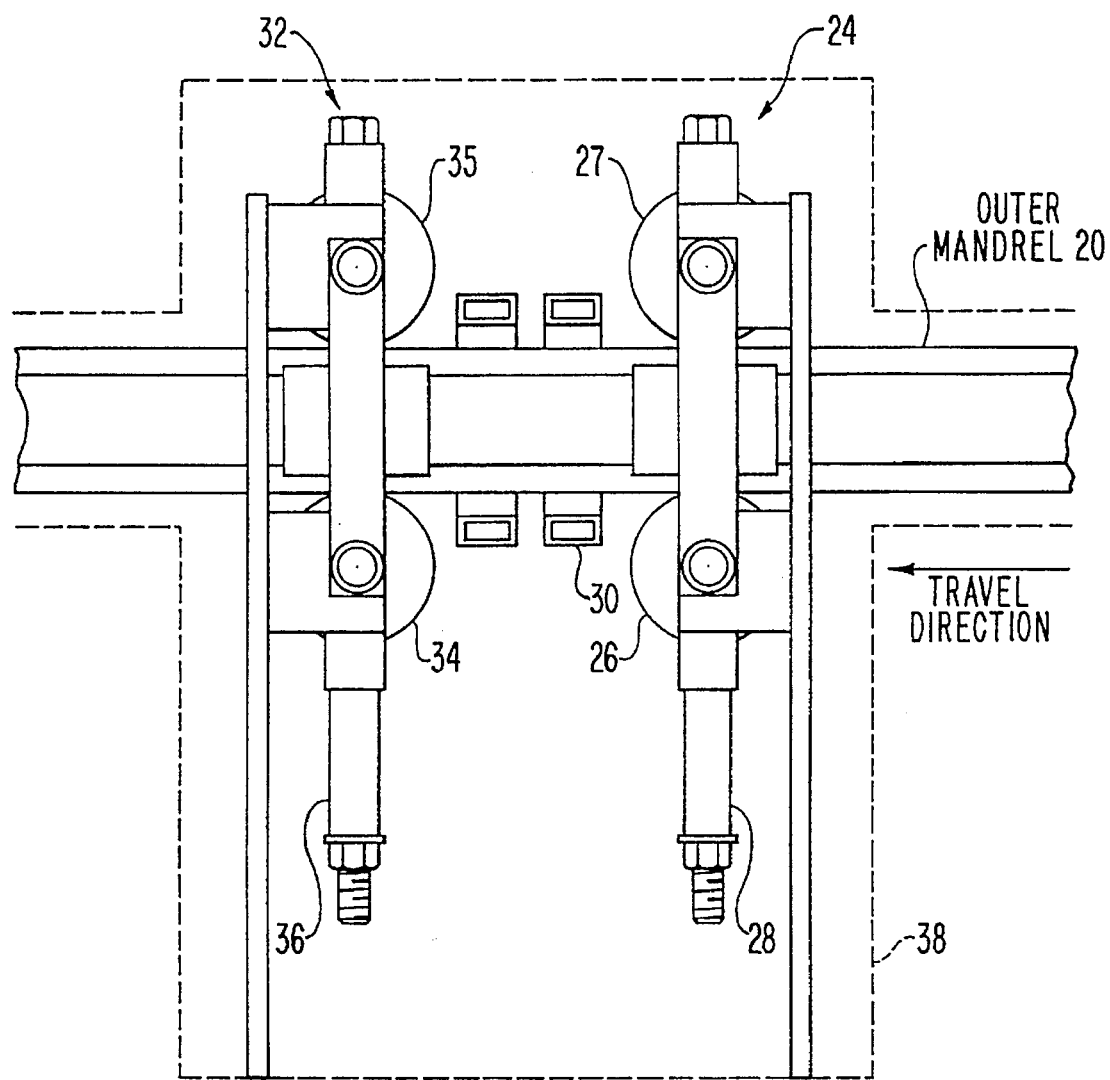

COMPOSITE CONSOLIDATION USING INDUCTION HEATING

This is a division of application Ser. No. 08/092,050, filed on Jul. 15, 1993, now U.S. Pat. No. 5,410,133 which is a division of application Ser. No. 07/681,004, filed on Apr. 5, 1991, now U.S. Pat. No. 5,229,562.

BACKGROUND OF THE INVENTION

1. Field of the Invention

The present invention relates to a process for consolidating a composite material and, more specifically, to a process for consolidating a workpiece including a matrix interspersed with fibers by applying pressure to the workpiece while heating it by an induction technique.

2. Description of the Related Art

In order to enhance the mechanical properties of monolithic materials used, for example, in advanced aerospace systems, one approach has been to develop composite materials in which two dissimilar materials having different mechanical and physical properties are combined to form a product having mechanical and physical properties superior to the individual constituents. For example, metals having good ductility and strength can be combined with fibers having low ductility, higher strength and stiffness, and lower density to form a stiff, lightweight composite material.

An example of such a composite material comprises titanium, which has a high specific strength (i.e., tensile strength to density ratio) and excellent corrosion resistance, combined with alumina-based, boron-based, or silicon carbide-based fibers. Many other fiber systems exist, e.g., graphite, which could also be utilized depending on the application. There are a number of processes for consolidating such composite materials including vacuum hot pressing and hot isostatic pressing.

Vacuum hot pressing involves stacking alternating layers of a metal matrix and fiber or layers of a fiber and matrix monotape and placing them in a vacuum hot press. After evacuation, a small positive mechanical pressure is applied via ceramic platens to hold the fibers in place. The temperature is gradually increased to a level wherein the metal matrix flows superplastically around the fibers under an increased pressure. This process, however, involves long heat cycle times, requires tight die tolerances, and uses large amounts of electrical power.

Hot isostatic pressing involves simultaneously subjecting a metal matrix and fiber composition to elevated temperatures and isostatic pressures. However, hot isostatic pressing involves the use of high gas pressure and thus requires very substantial vessels in order to manufacture large parts, resulting in very high equipment costs. Therefore, typically, only smaller metal matrix composite components are consolidated using this process due to the aforementioned equipment size and cost constraints.

The strict processing requirements, i.e., high temperatures and pressures and long processing times, associated with the vacuum hot pressing and hot isostatic pressing processes result in high production costs and complicated machinery and fixturing.

Another example of such a composite material comprises a thermoplastic combined with carbon-based fibers. Standard processes for consolidating these composite materials include autoclave processing or hot pressing. However, these processes, like the processes for consolidating metal matrix composites, involve long heat cycle times and require expensive tooling and equipment.

SUMMARY OF THE INVENTION

Accordingly, it is an object of the present invention to provide a low-cost process for consolidating a composite material wherein a workpiece including a matrix interspersed with fibers is supported by an electrically conductive support and then consolidated by inductively heating the support and thereby conductively heating the workpiece to a selected temperature, and applying pressure to the workpiece.

More specifically, an alternating current passing through a coil creates a changing magnetic flux which induces currents in the support thereby heating the support by induction. Because the support is in contact with the workpiece, the heat from the support conductively heats the workpiece. The conduction heat is used in conjunction with the pressure applied to the workpiece to consolidate the workpiece. Although some currents may also be induced in the workpiece by the coil, these currents are typically small and not evenly distributed throughout the workpiece because of the relatively low mass and shape, i.e., thin shape of the workpiece, and therefore, do not necessarily sufficiently heat the workpiece for consolidation. Accordingly, a benefit of inductively heating the support and thereby conductively heating the workpiece is that, because the mass and shape of the support can be easily controlled, it is possible to evenly heat the support and thus evenly heat the workpiece to a sufficient temperature for consolidation.

Additional objects and advantages of the invention will be set forth in the description that follows, and in part will be apparent from the description, or may be learned by practice of the invention. The objects and advantages of the invention may be realized and obtained by means of the instrumentalities and combinations particularly pointed out in the appended claims.

To achieve the foregoing objects, and in accordance with the purposes of the invention as embodied and broadly described herein, a process for consolidating a matrix composite is provided comprising the steps of forming a workpiece including a matrix interspersed with fibers, supporting the workpiece by an electrically conductive support, inductively heating the support and thereby conductively heating the workpiece to a selected temperature, and applying pressure to the workpiece.

In the embodiment, the steps of heating the support and the workpiece and applying pressure to the workpiece include the substeps of passing the support and the workpiece through a first roller set at a selected speed for applying a first pressure to the support and the workpiece, passing the support and the workpiece through an induction coil applying a selected amount of alternating current for inductively heating the support and thereby conductively heating the workpiece to the selected temperature, and passing the support and the workpiece through a second roller means for applying a second pressure to the support and the workpiece.

In one preferred embodiment, the support is a mandrel in two pieces comprising, for example, an inner mandrel and an outer mandrel, a top mandrel and a bottom mandrel, etc., and the process further comprises the substeps of progressively passing the mandrel and workpiece lengthwise at the selected speed through the first roller set, the induction coil, and the second roller set in that order, so that the mandrel and workpiece pass through the induction coil while simultaneously passing through at least one of the roller sets. The mandrel and the workpiece can be passed through the first and second roller sets and the induction coil by means known in the art. One such method includes associating a heat treated steel ball screw with the mandrel and turning the screw by an electric motor to either push or pull the mandrel and workpiece through the first and second roller sets and induction coil.

During the above process, the first roller set aids in guiding the mandrel and workpiece through the induction coil while the second roller set applies a predetermined amount of pressure to the mandrel and workpiece to eliminate any voids in the matrix-fiber interface which may result in weak bonding or no bonding at all. Also, a selected amount and frequency of alternating current flows through the induction coil for inductively heating the mandrel and thereby conductively heating the workpiece to a selected temperature. The geometries of the mandrel and workpiece, the speed with which the mandrel and workpiece pass through the first roller set, induction coil, and second roller set, the force exerted by the second roller set, as well as the current flowing through the induction coil are all monitored and balanced so that the selected temperature and pressure are maintained in the workpiece as it passes through the second roller set.

In another embodiment, the workpiece further includes a bonding aid interspersed between the matrix and fiber and having a melting temperature lower than that of either the matrix or fiber. Because of this lower melting temperature, the addition of the bonding aid to the composition of the workpiece aids in the consolidation process by reducing the amount of time and pressure required for consolidation and, depending on the bonding aid used, the level of temperature required for consolidation may also be reduced. Also, the addition of the bonding aid to the composition of the workpiece increases the chance of achieving a complete bond between the matrix and fiber or monotape to monotape by wetting the interface surfaces of the matrix to matrix or matrix to fiber area.

The consolidation process of the present invention offers both manufacturing benefits and structural advantages over the conventional processes. Manufacturing benefits include lower costs due to faster and more efficient heating cycles, the ability to manufacture elongated parts without needing complicated tooling, a reduction in the amount of labor and manufacturing hours required for material production, and the ability to produce large parts without requiring an increase in pressure. Structural benefits include a reduction of unfavorable fiber to matrix reactions, a reduction of bond-inhibiting oxide formation when consolidating metal matrix composites, and preservation of fiber strength due to shorter heating times. In addition, the consolidation process of the present invention is applicable to a wide variety of composite materials including, for example, metal matrix and thermoplastic composites.

BRIEF DESCRIPTION OF THE DRAWINGS

The accompanying drawings, which are incorporated in and constitute a part of the specification, illustrate presently preferred embodiments of the process of the invention and, together with the general description given above and the detailed description of the preferred embodiments given below, serve to explain the principles of the invention. In the drawings:

FIG. 3 is a side view partly in section of the apparatus used in achieving the first embodiment of the present invention;

DESCRIPTION OF THE PREFERRED EMBODIMENTS

Figure 1:
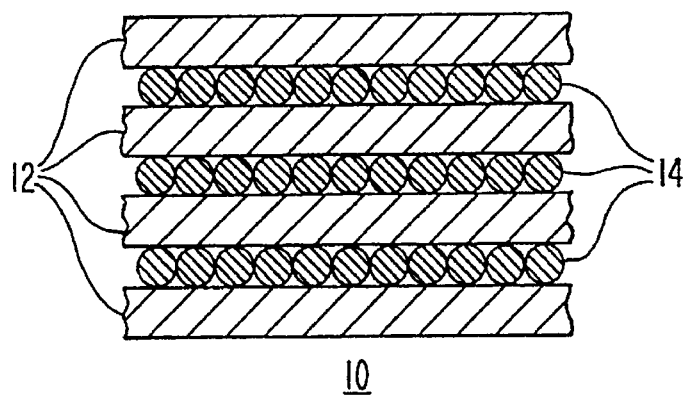
FIG. 1 is a cross-sectional view of a workpiece used in the first embodiment of the present invention.

Reference will now be made in detail to the presently preferred embodiments of the invention as illustrated in the accompanying drawings, in which like reference characters designate like or corresponding parts throughout the several drawings.

First Embodiment

In accordance with the first embodiment of the present invention, as shown in FIG. 1, workpiece 10 includes alternating layers of metal matrix 12 and fiber 14. Metal matrix 12 is comprised of, for example, a titanium or aluminum alloy foil. Likewise, fiber 14 is comprised of, for example, silicon carbide-based, alumina-based, or boron-based fibers in the form of a uniweave fabric. In the alternative, workpiece 10 can also be comprised of, for example, a fiber and matrix monotape comprising metal/fiber combinations of, for example, aluminum/boron carbide-boron (Al/B$_4$C—B), aluminum/silicon carbide (Al/SiC), aluminum/graphite (Al/Gr), titanium/silicon carbide (Ti/SiC), or titanium/alumina (Ti/Al$_2$O$_3$). Workpiece 10 can be formed into any one of a number of structural shapes such as a cylinder, plate, panel, tube, T-section, Z-section, etc.

Figure 2:
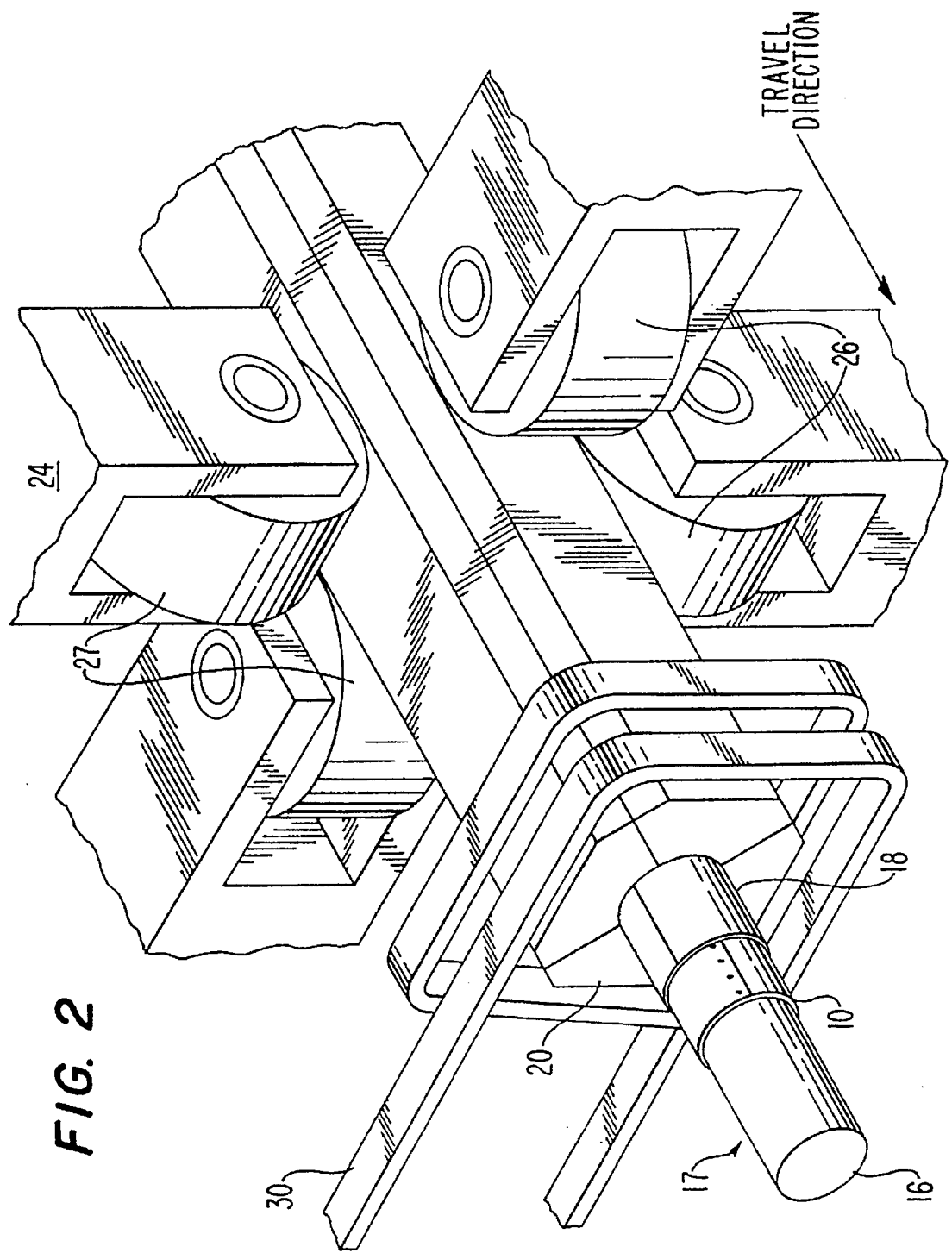
FIG. 2 is a perspective view of an apparatus used in achieving the first embodiment of the present invention.

In the embodiment shown in FIG. 2, workpiece 10 is in the form of a cylinder and is supported by inner mandrel 16 and shim 18 which comprise, for example, stainless steel or other material which will not deform excessively during the consolidation process. A layer of material such as boron nitride is placed on the surfaces of inner mandrel 16 and shim 18 which contact workpiece 10 to prevent their bonding with workpiece 10 during the consolidation process. In addition, inner mandrel 16 has a slight taper at 17 to facilitate removal of workpiece 10 from inner mandrel 16. Next, outer mandrel 20 is placed around shim 18, workpiece 10, and inner mandrel 16 to further support workpiece 10. Outer mandrel 20 comprises, for example, stainless steel or other electrically conductive material which will not deform excessively during the consolidation process.

As shown in FIGS. 2 and 3, workpiece 10, as carried by inner mandrel 16, outer mandrel 20 and shim 18, is progressively passed lengthwise by a means (not shown) through first roller set 24, induction coil 30, and second roller set 32 in that order, so that inner mandrel 16, outer mandrel 20, shim 18 and workpiece 10 pass through induction coil 30 while simultaneously passing through at least one of first and second roller sets 24 and 32. As embodied herein, first roller set 24 includes two spring loaded rollers 26, two fixed rollers 27, and Bellville washers 28. Bellville washers 28 can be adjusted to vary the amount of pressure exerted by first roller set 24 onto inner mandrel 16, outer mandrel 20, shim 18 and workpiece 10 to guide them through induction coil 30 and second roller set 32. Also as embodied herein, second roller set 32 includes two spring loaded rollers 34, two fixed rollers 35, and Bellville washers 36. Bellville washers 36 can be adjusted to vary the amount of pressures exerted by second roller set 32 onto inner mandrel 16, outer mandrel 20, shim 18 and workpiece 10 to ensure complete consolidation of workpiece 10.

A current source (not shown) is connected to induction coil 30 and provides an alternating current through induction coil 30 to inductively heat outer mandrel 20. Outer mandrel 20, in turn, conductively heats workpiece 10 to a selected temperature.

As seen in FIG. 3, the above consolidation process can be carried out in an inert atmosphere. To accomplish this, first and second roller sets 24 and 32 and induction coil 30 are surrounded by enclosure 38 containing an inert gas such as argon or helium to prevent oxidation of workpiece 10. In addition, the pressure applied to the second roller set 32 and the travel speed and geometry of inner mandrel 16, outer mandrel 20, shim 18 and workpiece 10 through first and second roller sets 24 and 32 and induction coil 30, as well as the frequency and amount of alternating current provided through induction coil 30 are monitored and balanced so as to ensure proper consolidation of workpiece 10. The above consolidation process causes metal matrix 12 to form a solid state metallurgical bond with fiber 46 resulting in the desired metal matrix composite.

Second Embodiment

Figure 4:
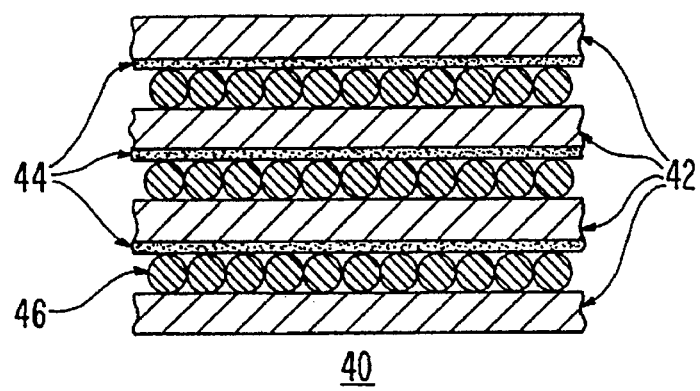
FIG. 4 is a cross-sectional view of a workpiece used in the first and second embodiments of the present invention.

In accordance with the second embodiment of the present invention, as shown in FIG. 4, workpiece 40 comprises alternating layers of metal matrix 42, bonding aid 44 and fiber 46. Metal matrix 42 is comprised of, for example, a titanium alloy foil, bonding aid 44 is comprised of, for example, approximately 70% Ti, 15% Ni and 15% Cu, and fiber 46 is comprised of, for example, silicon carbide fibers in the form of a uniweave fabric. As in the first embodiment, workpiece 40 can be formed into any one of a number of structural shapes such as a cylinder, plate, panel, tube, T-section, Z-section, etc.

Figure 5:
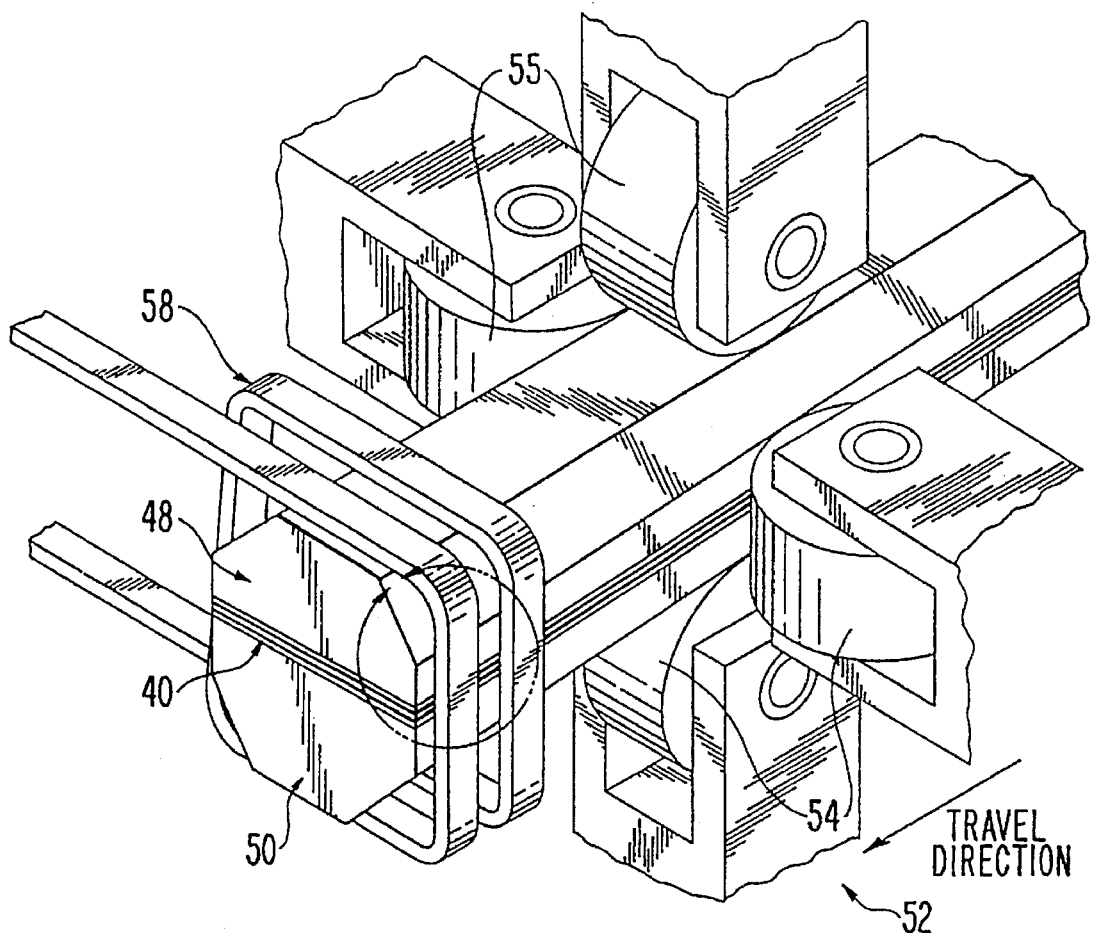
FIG. 5 is a perspective view of an apparatus used in achieving the first and second embodiments of the present invention.

As shown in FIG. 5, workpiece 40 is in the form of a panel and is supported by top mandrel 48 and bottom mandrel 50. A layer of material such as boron nitride is placed on the surfaces of top and bottom mandrels 48 and 50 which contact workpiece 40 to prevent their bonding with workpiece 40 during the consolidation process. Both top mandrel 48 and bottom mandrel 50 comprise, for example, stainless steel or other electrically conductive material which will not deform during the consolidation process.

Figure 6:
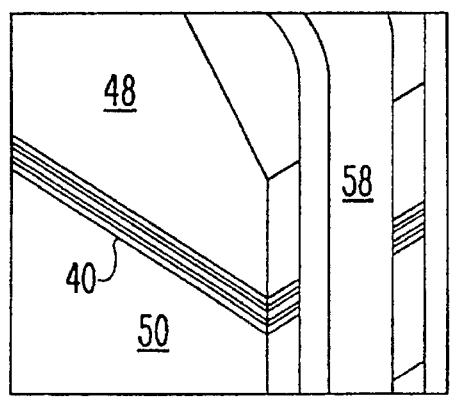
FIG. 6 is a detail view of the workpiece 40 shown in FIG. 5.
Figure 7:
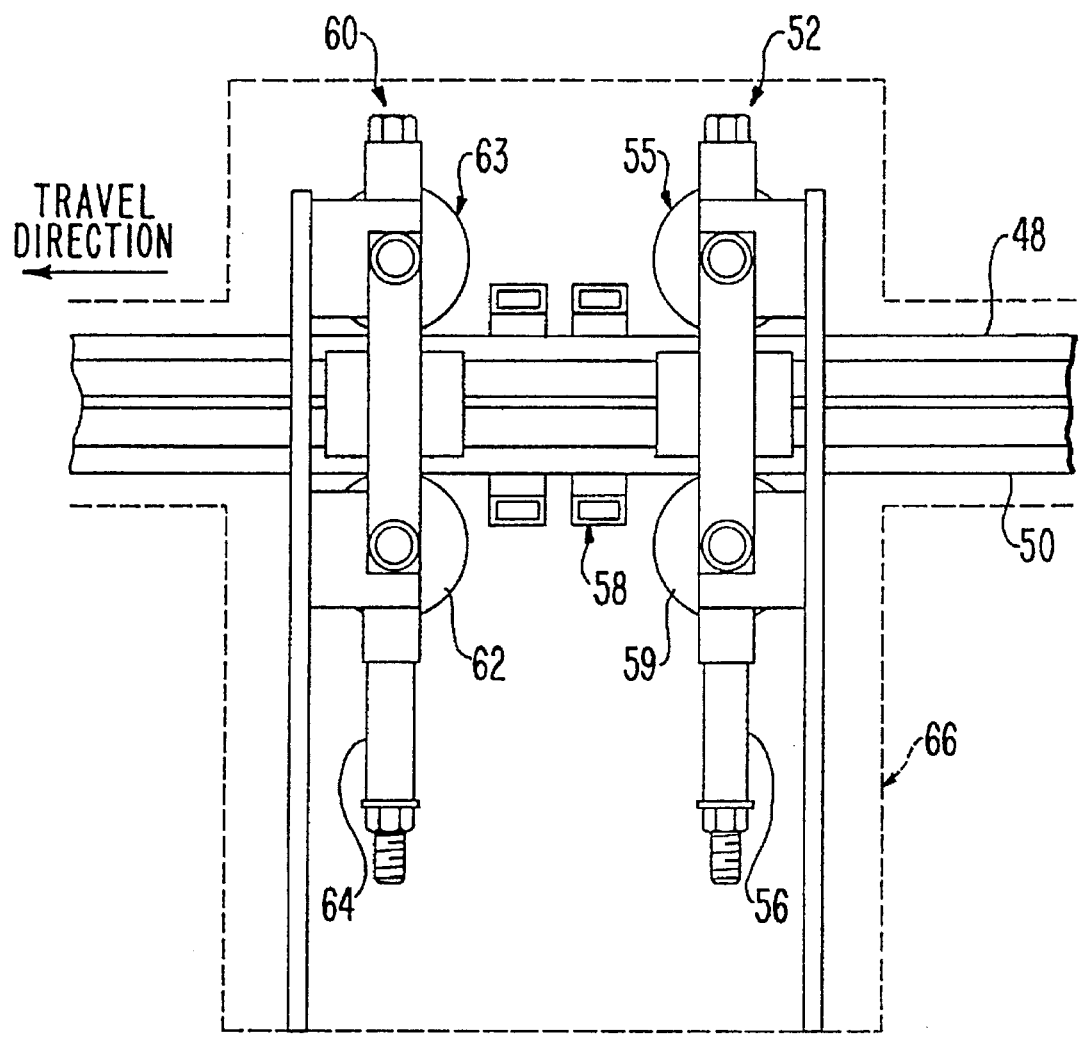
FIG. 7 is a side view partly in section of the apparatus used in achieving the first and second embodiments of the present invention.

As shown in FIGS. 5–7, workpiece 40, as carried by top and bottom mandrels 48 and 50, is progressively passed by a means (not shown) lengthwise at a selected speed through first roller set 52, induction coil 58, and second roller set 60 in that order, so that top and bottom mandrels 48 and 50 and workpiece 40 pass through induction coil 58 while simultaneously passing through at least one of first and second roller sets 52 and 60. As embodied herein, first roller set 52 includes two spring loaded rollers 54, two fixed rollers 55, and Bellville washers 56. Bellville washers 56 can be adjusted to vary the amount of pressure exerted by first roller set 52 onto top and bottom mandrels 48 and 50 and workpiece 40 to guide them through induction coil 58 and second roller set 60. Also as embodied herein, second roller set 60 includes two spring loaded rollers 62, two fixed rollers 63, and Bellville washers 64. Bellville washers 64 can be adjusted to vary the amount of pressure exerted by second roller set 60 onto top and bottom mandrels 48 and 50 and workpiece 40 to ensure complete consolidation of workpiece 40.

A current source (not shown) is connected to induction coil 58 and provides an alternating current through induction coil 58 to inductively heat top and bottom mandrels 48 and 50. Top and bottom mandrels 48 and 50, in turn, conductively heat workpiece 40 to a selected temperature.

During the above consolidation process, first and second roller sets 52 and 60 and induction coil 58 are surrounded by enclosure 66 containing an inert gas to prevent oxidation of workpiece 40. In addition, the pressure applied by second roller set 60, the travel speed of top and bottom mandrels 48 and 50 and workpiece 40 through first and second roller sets 52 and 60 and induction coil 58 and their respective geometries, as well as the frequency and amount of current provided through induction coil 58 are monitored and balanced so as to ensure proper consolidation of workpiece 40. The above consolidation process causes bonding aid 44 to melt and flow between metal matrix 42 and fibers 46 thus forming a metallurgical bond therebetween. The consolidation pressure and temperature are maintained and the heating period is kept short so as to limit any chemical reaction between bonding aid 44 and fiber 46 to that which is necessary to establish a bond therebetween.

Because bonding aid 44 has a lower melting temperature than either metal matrix 42 or fiber 46, the consolidation of workpiece 40 can be achieved under the conditions of lower pressure and significantly shorter heating times than both the process of the first embodiment and the conventional processes. Also, depending on the properties of bonding aid 44, the level of temperature required for consolidation may also be lower. Therefore, both manufacturing costs and manufacturing times can be reduced.

The use of bonding aid 44 during consolidation of workpiece 40 is not limited to consolidation by the induction heating technique of the present invention. It is possible to use any known heating technique to melt bonding aid 44 so that it flows between metal matrix 42 and fiber 46 or between layers of a fiber and matrix monotape (as described in the first embodiment) thus aiding in the consolidation of the two materials.

Third Embodiment

Figure 8:
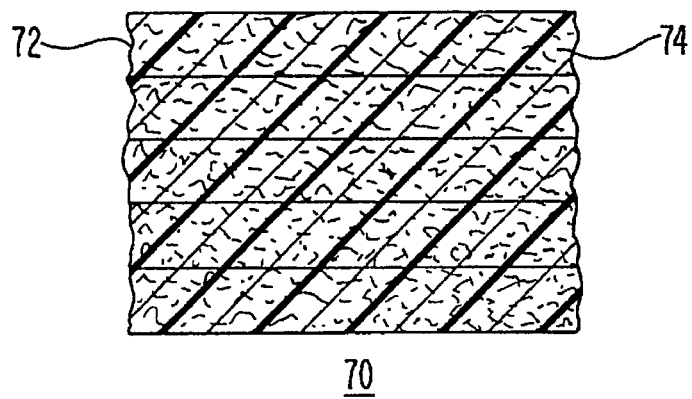
FIG. 8 is a cross-sectional view of a workpiece used in the third embodiment of the present invention.

In accordance with the third embodiment of the present invention, as shown in FIG. 8, workpiece 70 includes layers of a prepreg including thermoplastic matrix 72 interspersed with fibers 74. Matrix 72 is comprised of, for example, a thermoplastic resin such as HTA or RADEL 8320 and fibers 74 are comprised of, for example, carbon fibers, so that workpiece 70 is in the form of, for example, a peek/carbon prepreg such as APC-2. As in the first and second embodiments, workpiece 70 can be formed into any one of a number of structural shapes such as a cylinder, plate, panel, tube, T-section, Z-section, etc.

Figure 9:
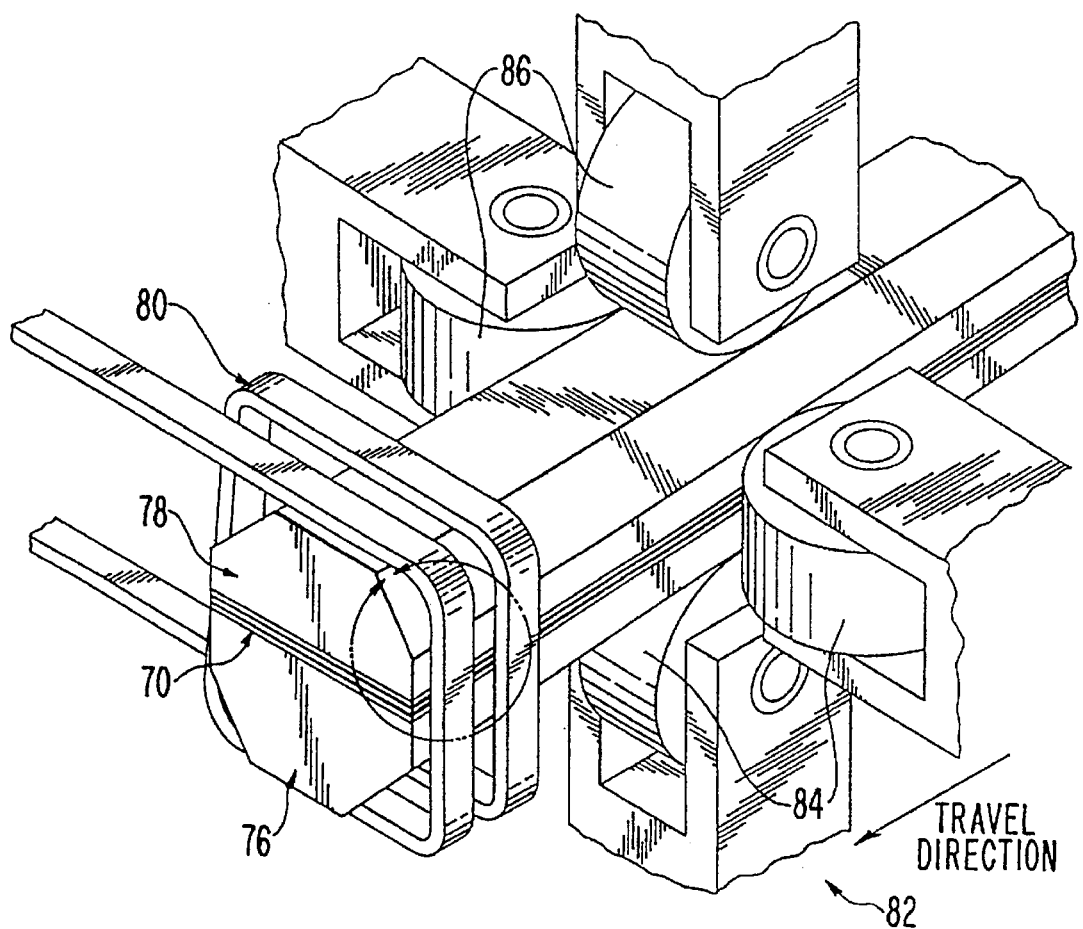
FIG. 9 is a perspective view of an apparatus used in achieving the third embodiment of the present invention.

As shown in FIG. 9, workpiece 70 is in the shape of a panel and is supported by top mandrel 78 and bottom mandrel 76. A layer of material such as boron nitride is placed on the surfaces of top and bottom mandrels 78 and 76 which contact workpiece 70 to prevent their bonding with workpiece 70 during the consolidation process. Both top mandrel 78 and bottom mandrel 76 comprise, for example, copper, or other electrically conductive material which will not deform excessively during the consolidation process.

Figure 10:
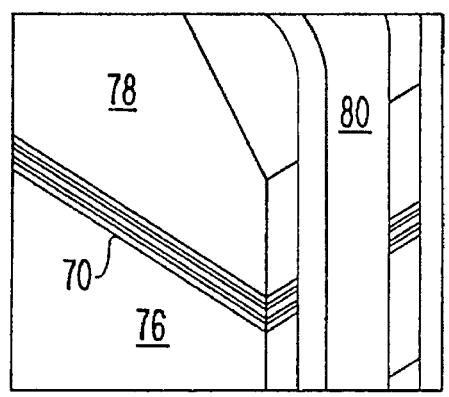
FIG. 10 is a detail view of the workpiece 70 shown in FIG. 9.
Figure 11:
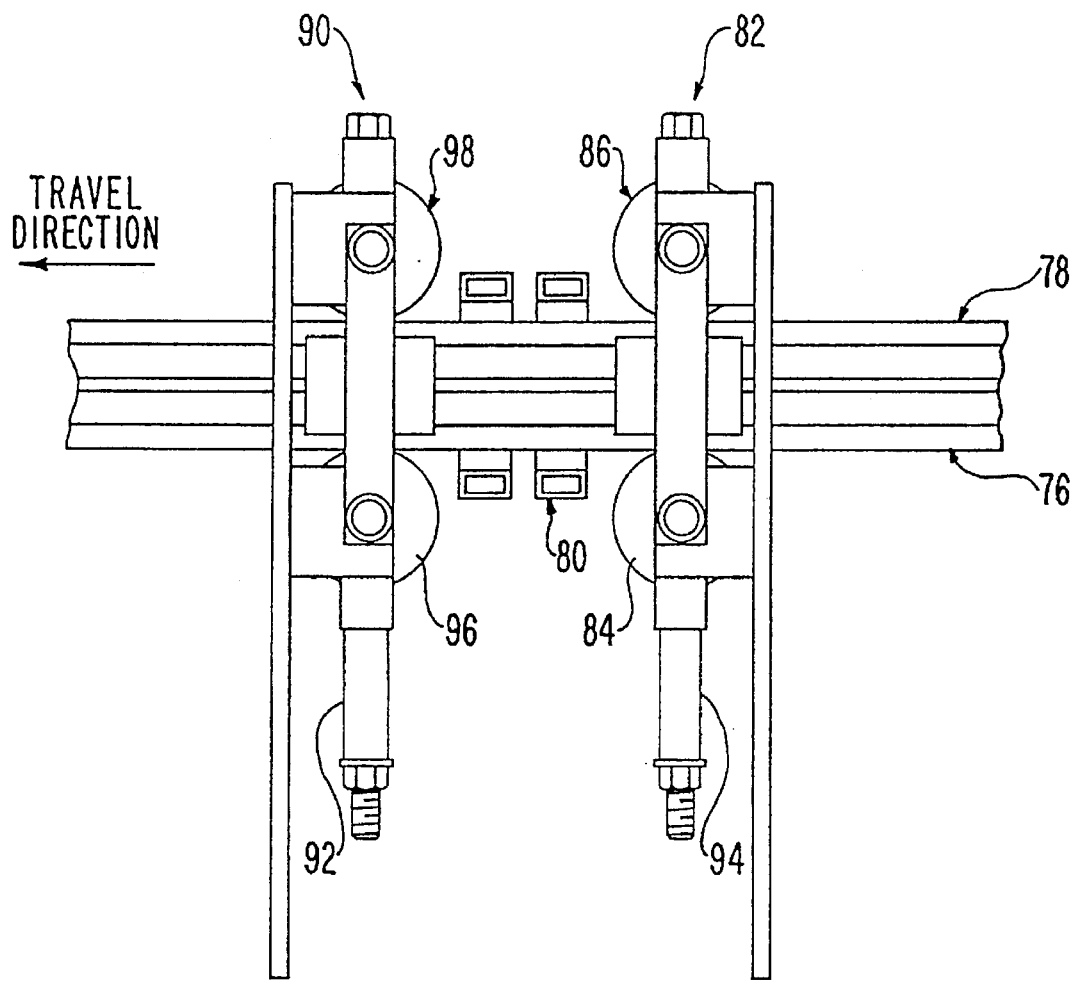
FIG. 11 is a side view partly in section of the apparatus used for achieving the third embodiment of the present invention.

As shown in FIGS. 9–11, workpiece 70, as carried by top and bottom mandrels 78 and 76, is progressively passed lengthwise at a selected speed by a means (not shown) through first roller set 82, induction coil 80, and second roller set 90 in that order, so that top and bottom mandrels 78 and 76 and workpiece 70 pass through induction coil 80 while simultaneously passing through at least one of first and second roller sets 82 and 90. As embodied herein, first roller set 82 includes two spring loaded rollers 84, two fixed rollers 86, and Bellville washers 94. Bellville washers 94 can be adjusted to vary the amount of pressure exerted by first roller set 82 onto top and bottom mandrels 78 and 76 and workpiece 70 to guide them through induction coil 80 and second roller set 90. Also as embodied herein, second roller set 90 includes two spring loaded rollers 96, two fixed rollers 98, and Bellville washers 92. Bellville washers 92 can be adjusted to vary the amount of pressure exerted by second roller set 90 onto top and bottom mandrels 78 and 76 and workpiece 70 to ensure complete consolidation of workpiece 70.

A current source (not shown) is connected to induction coil 80 and provides an alternating current through induction coil 80 to inductively heat top and bottom mandrels 78 and 76. Top and bottom mandrels, in turn, conductively heat workpiece 70 to a selected temperature.

The distance between first and second roller sets 82 and 90 and the pressure applied by each of them, the travel speed of top and bottom mandrels 78 and 76 and workpiece 70 through first and second roller sets 82 and 90 and induction coil 80 and their respective geometries, as well as the frequency and amount of current provided through induction coil 80 are monitored and balanced so as to ensure proper consolidation of workpiece 70.

In the foregoing metal matrix or thermoplastic embodiment of the present invention, the variables are driven by the type of materials being consolidated. However, certain universal guidelines apply. For example, the force applied to the roller should be approximately equal to the standard HIP, hot press, or autoclave pressures multiplied by the thickness of the support and the width of the part being consolidated. Further, the travel speed of the mandrels should be such that the required established consolidation temperature is maintained at the area under the roller.

Figure 12:
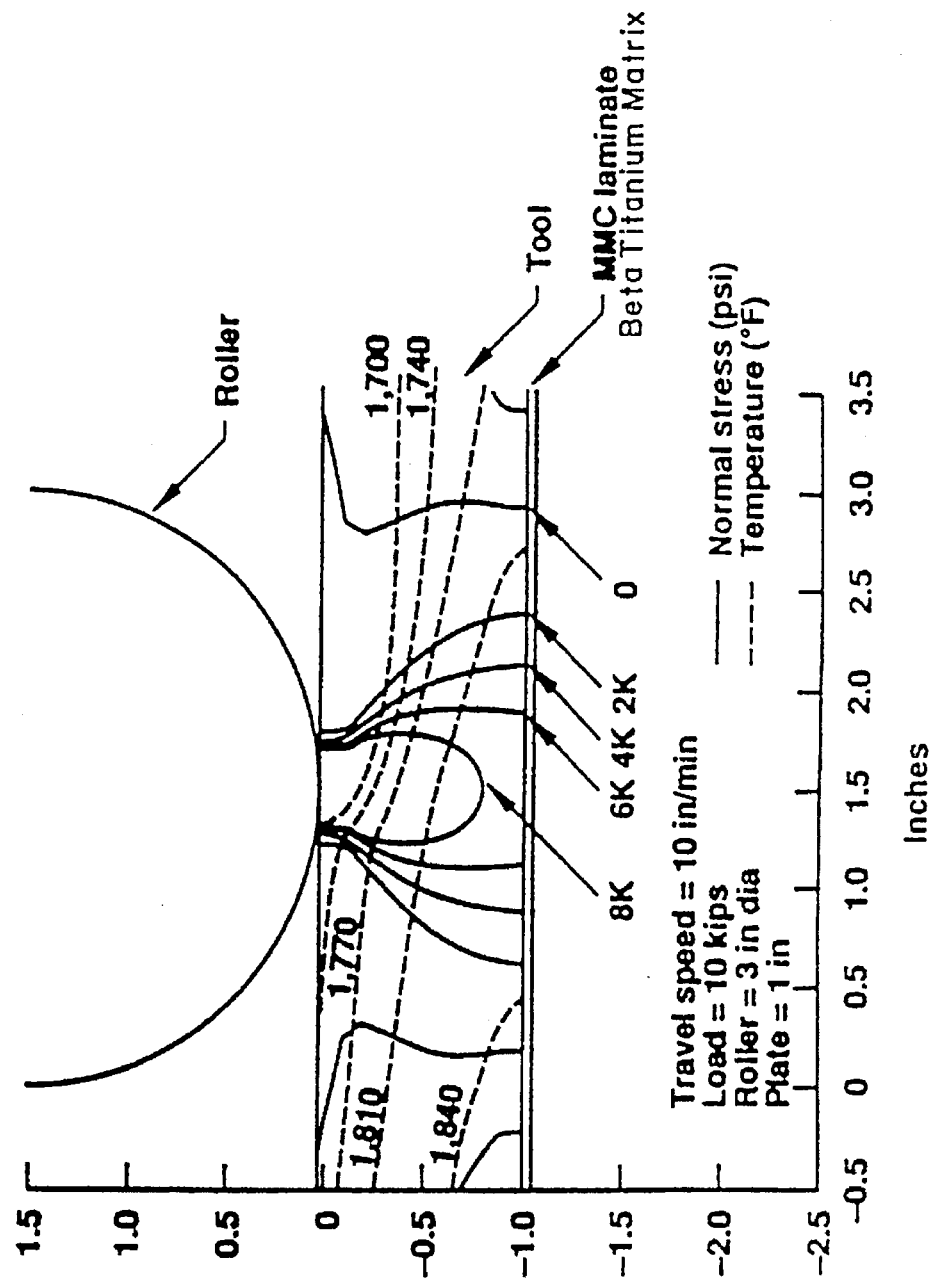
FIG. 12 is a plot of stress contours and isotherms in the tool and composite depicting preferred consolidation parameters for a beta titanium matrix composite.

FIG. 12 can be used as a guide for consolidation of beta titanium alloys. As shown in the figure, the travel speed is 10 inches/minute given a 1.0 inch tool plate thickness and a load of 10 Kips per inch of sample width. Further, the tool material is stainless steel and the induction heating frequency is 1000 Hz. This provides a current which travels the entire thickness of the tooling and which provides even, thorough heating. It should be understood that the pressure required for aluminum alloys and thermoplastics, however, should be less than that shown in FIG. 12 due to the reduction in matrix strength. The frequency should be such that current is driven through the entire thickness of the exposed tooling. These frequencies are readily calculable from induction heating handbooks. The temperature of the workpieces should be either described by the flow temperature of the bonding aid or the standard consolidation temperature established by other methods. Also, the roller diameter should be 3 inches or greater to allow for sufficient mass to be available for roller temperature control.

EXAMPLE 1

An example of the first embodiment will now be given with reference to FIGS. 1–3.

Workpiece 10, an Al/$B_4$C—B monotape, comprised a tube having an outside diameter of 1.53 inches, a wall thickness of 0.05 inch, and a length of 17.3 inches. Workpiece 10 was fitted around inner mandrel 16 and further supported by shim 18 and outer mandrel 20. A layer of boron nitride was applied to the surfaces of inner mandrel 16 and shim 18 which contacted workpiece 10 to prevent their bonding with workpiece 10 during the consolidation process. Both inner mandrel 16 and outer mandrel 20 comprised 321 stainless steel and inner mandrel 16 had a slight taper at 17 of about 4° to facilitate removal of workpiece 10 from the mandrel. Inner mandrel 16 could also have comprised a collapsible part to further assist removal of workpiece 10 from the mandrel.

Next, inner mandrel 16, outer mandrel 20, shim 18 and workpiece 10 were progressively passed lengthwise by a means (not shown) through first roller set 24, induction coil 30, and second roller set 32 in that order at a rate of 0.3 inch/minute so that each passed through induction coil 30 while simultaneously passing through at least one of first and second roller sets 24 and 32. First and second roller sets 24 and 32 were spaced 4.25 inches apart. Spring loaded rollers 26 and 34 and fixed rollers 27 and 35 were formed of 4340 steel. Bellville washers 36 were adjusted so that second roller set 32 applied about 1500 pounds of pressure to inner mandrel 16, outer mandrel 20, shim 18 and workpiece 10. Induction coil 30 comprised 0.25 inch outer diameter copper tubing formed into two square coils spaced 0.25 inch apart, each coil having sides 2⅞ inches long. Approximately 10 KW of a 450 KHz alternating current was supplied to induction coil 30 by a high frequency power supply (not shown) so that outer mandrel 20 was inductively heated and workpiece 10 was thereby conductively heated to about 1170° F. During the consolidation process, first and second roller sets 24 and 32 were surrounded by an argon inert gas in enclosure 38 comprising plexiglass to prevent oxidation of workpiece 10 during the consolidation process.

The above process resulted in substantially complete consolidation of workpiece 10 with disbonding limited to very small areas. The parameters were non-optimal due to the developmental nature of the facilities. Preferably, the travel speed should have been in the 3 to 4 inches/minute range.

EXAMPLE 2

Another example of the first embodiment will now be given with reference to FIGS. 1 and 5–7.

Workpiece 10 comprised alternating layers of matrix 12 of Ti—6Al—4V (90% Ti, 6% Al, 4% V) and silicon carbide fibers 14, formed into a 2 inches×1.75 inches×7 inches panel. Workpiece 10 was then placed between top mandrel 48 and bottom mandrel 50 each comprising 13–8 stainless steel. A layer of boron nitride was applied to the surfaces of top and bottom mandrels 48 and 50 which contacted workpiece 10 to prevent their bonding with workpiece 10 during the consolidation process.

Next, top and bottom mandrels 48 and 50 and workpiece 10 were progressively passed lengthwise by a means (not shown) through first roller set 52, induction coil 58, and second roller set 60 in that order at a rate of 0.6 inch/minute so that each passed through conduction coil 58 while simultaneously passing through at least one of first and second roller sets 52 and 60. First and second roller sets 52 and 60 were spaced 4.25 inches apart. Bellville washers 64 were adjusted so that second roller set 60 applied about 9,774 pounds of force per inch of roller to top and bottom mandrels 48 and 50 and workpiece 10. Induction coil 58 comprised 0.25 inch outer diameter copper tubing formed into two octagonal coils spaced ⅛ inch apart wherein each coil had an approximate diameter of 2 inches. Approximately 10 KW of a 450 KHz alternating current was supplied to induction coil 58 by a high frequency power supply (not shown) so that top and bottom mandrels 48 and 50 were inductively heated and workpiece 10 was thereby conductively heated to about 1870° F. During the consolidation process, first and second roller sets 52 and 60 and induction coil 58 were surrounded by enclosure 66 comprised of plexiglass containing argon gas to prevent oxidation of workpiece 10 during the consolidation process.

The above process resulted in partial consolidation of workpiece 10 into a metal matrix composite. Significant areas of unbonded metal occurred. These were a result of insufficient travel speed to provide adequate temperature at the point of highest roller imposed load. Parameters of 10 inches/minute travel with a 1.0 inch thick tool plate thickness using 1750 with 10 Kips per inch or roller length would be closer to optimal. Some increase in roller force may also be necessary depending on the form (e.g., monotape or foil/fiber/foil) of the material being processed. The monotape should have a lower pressure requirement. Also, the frequency of the current should be in the 1 to 3 KHz range to ensure even heating. However, even with these facility limitations, bonding did occur.

EXAMPLE 3

An example of the second embodiment will now be given with reference to FIGS. 4–6.

Workpiece 40 was a 2 inches×1.75 inches×7 inches panel comprised of alternating layers of 0.004 inch thick Ti—15V—3Cr—3Sn—3Al (76% Ti, 15% V, 3% Cr, 3% Sn, 3% Al) foil matrix 42, 0.002 inch thick TiCuNi bonding aid 44 (approximately 70% Ti, 15% Ni, 15% Cu) and uniweave fabric comprising 0.0056 inch diameter silicon carbide fibers 46. Workpiece 40 was placed between top mandrel 48 and bottom mandrel 50 each comprising 13-8 stainless steel. A layer of boron nitride was applied to the surfaces of top and bottom mandrels 48 and 50 which were in contact With workpiece 40 to prevent their bonding with workpiece 40 during the consolidation process.

Next, top and bottom mandrels 48 and 50 and workpiece 40 were progressively passed lengthwise by a means (not shown) through first roller set 52, induction coil 58, and second roller set 60 in that order at a rate of 0.45 inch/minute so that each passed through induction coil 58 while simultaneously passing through at least one of first and second roller sets 52 and 60 which were spaced 4.25 inches apart. Bellville washers 64 were adjusted so that second roller set 60 applied about 7,500 pounds of force per inch of roller to top and bottom mandrels 48 and 50 and workpiece 40. Induction coil 58 comprised 0.25 inch outer diameter copper tubing formed into two octagonal coils spaced ⅛ inch apart wherein each coil had an approximate diameter of 2 inches. Approximately 10 KW of a 450 KHz alternating current was supplied to induction coil 58 by a high frequency power supply (not shown) so that top and bottom mandrels 48 and 50 were inductively heated and workpiece 40 was thereby conductively heated to about 1890° F. During the consolidation process, first and second roller sets 52 and 60 and induction coil 58 were surrounded by enclosure 66 of plexiglass containing argon gas to prevent oxidation of workpiece 40 during the consolidation process.

The above process resulted in consolidation of workpiece 40 into a metal matrix composite. Inspection of the workpiece revealed good, void-free consolidation. Further inspection of the workpiece microstructure showed that reaction between the fiber and bonding aid was negligible. Again, non-optimal parameters were used due to facility constraints. Travel speeds of around 10 inches/minute with a lower induction frequency would be recommended.

EXAMPLE 4

An example of the third embodiment will now be given with reference to FIGS. 8–11.

Workpiece 70, a 2 inch×1.50 inch×7 inch panel comprised of layers of thermoplastic matrix 72 interspersed fibers 74, in the form of APC-2 peek/carbon monotape, was placed between top mandrel 78 and bottom mandrel 76 each comprising copper.

Next, top and bottom mandrels 78 and 76 and workpiece 70 were progressively passed lengthwise by a means (not shown) through first roller set 82, induction coil 80, and second roller set 90 in that order at a rate of 0.5 inch/minute so that each passed through conduction coil 80 while simultaneously passing through at least one of first and second roller sets 82 and 90. First and second roller sets 82 and 90 were spaced 4.25 inches apart. Bellville washers 92 were adjusted so that second roller set 90 applied about 1,000 pounds of pressure to top and bottom mandrels 78 and 76 and workpiece 70. Induction coil 80 comprised 0.25 inch outer diameter copper tubing formed into two octagonal coils spaced ⅛ inch apart wherein each coil had an approximate diameter of 2 inches. Approximately 10 KW of a 450 KHz alternating current was supplied to induction coil 80 by a high frequency power supply (not shown) so that top and bottom mandrels 78 and 76 were inductively heated and workpiece 70 was thereby conductively heated to about 760° F. During the consolidation process, first and second roller sets 82 and 90 and induction coil 80 were surrounded by enclosure 88 of plexiglass and containing argon gas to prevent unwanted chemical reactions between workpiece 70 and the surrounding atmosphere during the consolidation process.

The above process resulted in consolidation of workpiece 70 into a thermoplastic composite.

Additional advantages and modifications will readily occur to those skilled in the art. For example, the processing time, pressure and temperature may be varied to accommodate the consolidation of any number of different matrix and fiber combinations. In addition, a variety of apparatuses may be used to perform the consolidation process. Therefore, the invention in its broader aspects is not limited to the specific details, representative devices, and illustrative examples shown and described. Accordingly, departures may be made from such details without departing from the spirit or scope of the general inventive concept as defined by the appended claims and their equivalents.

What is claimed is:

1. In a process for roll consolidating a metal matrix composite by applying pressure through a metal mandrel, the mandrel surrounding a layup of the raw materials of the metal matrix composite and heating the layup through the mandrel, the improvement comprising the step of applying a release agent between the mandrel and the layup, the release agent keeping the metal matrix composite from bonding with the mandrel.

2. The method of claim 1 wherein the release agent is boron nitride.

3. The process of claim 1 wherein the metal matrix composite raw materials include (a) a metal selected from the group consisting of aluminum, titanium, aluminum alloys, and titanium alloys; (b) a bonding aid; and (c) ceramic fibers.

4. The process of claim 2 wherein the mandrel is a metal selected from the group consisting of copper and stainless steel, the mandrel having a slight taper on a contact surface with the layup to facilitate release.

5. The process of claim 4 wherein the layup is heated by inductively heating the mandrel followed by conducting heat from the mandrel to the composite.

6. The process of claim 5 wherein the pressure is applied prior to inductively heating the mandrel by passing the mandrel and layup through a first set of spaced rolls.

* * * * *